United States Patent
Luh et al.

(10) Patent No.: US 8,126,280 B2
(45) Date of Patent: Feb. 28, 2012

(54) ENHANCED DECOMPRESSION OF COMPRESSED DATA

(75) Inventors: Walter Luh, Sunnyvale, CA (US); Samuli Tapio Kekki, San Francisco, CA (US)

(73) Assignee: Adobe Systems Incorporated, San Jose, CA (US)

(*) Notice: Subject to any disclaimer, the term of this patent is extended or adjusted under 35 U.S.C. 154(b) by 1095 days.

(21) Appl. No.: 11/967,530

(22) Filed: Dec. 31, 2007

(65) Prior Publication Data

US 2009/0080784 A1 Mar. 26, 2009

Related U.S. Application Data

(60) Provisional application No. 60/966,553, filed on Sep. 21, 2007.

(51) Int. Cl.
*G06K 9/36* (2006.01)

(52) U.S. Cl. ........................................ 382/233

(58) Field of Classification Search .......... 382/232–233, 382/250–251, 261, 276–277, 298; 345/419–420, 345/423–424, 427, 648–649, 653–654, 660, 345/672; 375/240.2, 240.25, 240.26
See application file for complete search history.

(56) References Cited

U.S. PATENT DOCUMENTS

| | | | | |
|---|---|---|---|---|
| 6,556,193 B1* | 4/2003 | Auld et al. | ..................... | 345/418 |
| 6,868,188 B2* | 3/2005 | Skodras et al. | ............... | 382/250 |
| 7,050,656 B2* | 5/2006 | Bhaskaran et al. | ............ | 382/298 |
| 7,180,944 B2* | 2/2007 | Lin et al. | .................. | 375/240.16 |

OTHER PUBLICATIONS

Bo Shen and Ishwar K. Sethi; "Scanline algorithms in compressed domain"; *SPIE* vol. 2668, *Digital Video Compression: Algorithms and Technologies*, San Jose 1996; 12 pages.

* cited by examiner

*Primary Examiner* — Jose Couso
(74) *Attorney, Agent, or Firm* — Fish & Richardson P.C.

(57) ABSTRACT

Enhanced decompression of compressed images, in which a decompressed image with a target resolution is assembled using an iteratively decompressed and downscaled quantity of scanlines of a compressed image, the quantity of scanlines correlating to a downscaling factor determined based on an original resolution of the compressed image and the target resolution.

21 Claims, 4 Drawing Sheets

ENHANCED DECOMPRESSION OF COMPRESSED DATA

CROSS-REFERENCE TO RELATED APPLICATION

This application claims the benefit of U.S. Provisional Patent Application No. 60/966,553, filed Sep. 21, 2007, which is incorporated herein by reference.

FIELD

The present disclosure generally relates to data compression.

BACKGROUND

Image compression describes the application of data compression to digital images. One reason for performing image compression is to reduce redundancy of image data in order to expediently store or transmit that data.

Image compression can be lossy or lossless. Since lossy compression approaches induce compression artifacts, lossless compression is often used for important or non-photographic images, such as medical imagery, or technical or other hand drawings. Lossy approaches, on the other hand, are often used for photographic images, since minor, often imperceptible losses of fidelity is typically an acceptable trade-off to achieving a reduction in bit rate.

SUMMARY

Under certain circumstances, such as upon the detection of a low memory condition, compressed images can be decompressed and/or downscaled on a scanline-by-scanline basis, instead of decompressing and downscaling the entire compressed image at once. In doing so, the extent and type of the resources used by a device rendering the resulting image are reduced without necessarily affecting the fidelity of that image.

According to one general implementation, a decompressed image with a target resolution is assembled using an iteratively decompressed and downscaled quantity of scanlines of a compressed image, the quantity of scanlines correlating to a downscaling factor determined based on an original resolution of the compressed image and the target resolution.

According to another general implementation, a computer-implemented method includes determining a downscaling factor for a compressed image based on an original resolution of the compressed image and a target resolution, and iteratively decompressing a quantity of scanlines of the compressed image correlating to the determined downscaling factor. The method also includes downscaling, for each iterative decompression, the iteratively decompressed quantity of scanlines, and assembling a decompressed image with the target resolution using the downscaled quantity of scanlines.

Implementations may include one or more of the following features. For example, the assembled, decompressed image may be output. The downscaling factor may be an integer. The quantity of scanlines of the compressed image may be determined based on the determined downscaling factor. The quantity of scanlines may equal the downscaling factor or may be inversely proportional to the downscaling factor. A low memory condition may be detected, and the iteratively decompressed quantity of scanlines may be downscaled if the low memory condition is detected. The compressed image may be compressed using a Tagged Image File Format (TIFF) format, a Portable Network Graphics (PNG) format, a Graphics Interchange Format (GIF) format, a Joint Photographic Experts Group (JPEG) format, a RAW image file format, or a bitmap (BMP) format.

In additional examples, downscaling the iteratively decompressed quantity of scanlines may further include averaging characteristics of the iteratively decompressed quantity of scanlines or filtering the iteratively decompressed quantity of scanlines. The original resolution and the target resolution may share a same aspect factor. A scanline may be a horizontal, one-pixel-high row, a vertical, one-pixel-wide line of the image, or a diagonal line. The assembled, decompressed image may be upscaled. The target resolution may be a screen resolution of a mobile device storing the compressed image. The iteratively decompressed quantity of scanlines may be discarded after the quantity of scanlines has been downscaled. The image may further include a plurality of scanlines, where the quantity of scanlines is a subset of the plurality of scanlines.

In additional examples, the downscaling factor may be determined based on Equation (1).

$$f=(\text{MIN}(\text{floor}(w/wDst),\text{floor}(h,hDst))) \text{ if } (f==1)\{f=2\} \quad (1)$$

In Equation (1), f represents the downscaling factor, w and h respectively represent horizontal and vertical aspects of the original resolution, and wDst and hDst respectively represent horizontal and vertical aspects of the target resolution. The original resolution may be a resolution associated with an uncompressed version of the compressed image. Iteratively decompressing the quantity of scanlines of the compressed image further may further include decompressing a first of the quantity of scanlines in parallel with decompressing a second of the quantity of scanlines.

According to another general implementation, a computer program product is tangibly embodied in a machine-readable medium. The computer program product includes instructions that, when read by a machine, operate to cause a data processing apparatus to determine a downscaling factor for a compressed image based on an original resolution of the compressed image and a target resolution, and to iteratively decompress a quantity of scanlines of the compressed image correlating to the determined downscaling factor. The computer program product also includes instructions that, when read by a machine, operates to cause a data processing apparatus to downscale, for each iterative decompression, the iteratively decompressed quantity of scanlines, and to assemble a decompressed image with the target resolution using the downscaled quantity of scanlines.

According to another general implementation, a device includes a processor that determines a downscaling factor for a compressed image based on an original resolution of the compressed image and a target resolution, and iteratively decompresses a quantity of scanlines of the compressed image correlating to the determined downscaling factor. The processor also downscales, for each iterative decompression, the iteratively decompressed quantity of scanline, and assembles a decompressed image with the target resolution using the downscaled quantity of scanlines.

According to a further general implementation, a computer-implemented method includes determining a downscaling factor for a compressed image based on an original resolution of the compressed image and a screen resolution of a mobile device storing the compressed image, where the image is compressed using a JPEG format and includes a plurality of scanlines. The method also includes determining a quantity of scanlines of the compressed image based on the determined downscaling factor, the quantity of scanlines being a subset of the plurality of scanlines, detecting a low memory condition of a mobile device, and iteratively decompressing the quantity of scanlines each comprising a horizontal, one-pixel-high row of the image. Furthermore, the method includes downscaling, for each iterative decompression, the iteratively decompressed quantity of scanlines if the low memory condition is detected, by averaging characteristics of the iteratively decompressed quantity of scanlines, and assembling a decompressed image with the target resolution using the iteratively decompressed quantity of scanlines. Additionally, the method includes upscaling the assembled image, and outputting the upscaled image at the mobile device, where the upscaled image and the compressed image share a same aspect factor.

The details of one or more implementations of the subject matter described in this specification are set forth in the accompanying drawings and the description below. Other potential features, aspects, and advantages of the disclosure will become apparent from the description, the drawings, and the claims.

BRIEF DESCRIPTION OF THE DRAWINGS

Like reference numbers and designations in the various drawings indicate like elements.

DETAILED DESCRIPTION

Decompressing and displaying compressed images is computationally expensive for devices with limited resources, such as mobile devices with low memory, processing, or transmission bandwidth capabilities. Using the enhanced decompression approach described herein, however, images are decompressed for display by downscaling the image on a per-scanline basis, to ensure that these devices are able to complete the decompression process. This enhanced approach may result in less memory being consumed than other, more typical image decompression processes.

In one example configuration, the enhanced decompression process may be dynamically implemented in response to detecting a low memory condition, situation or circumstance, resulting in downscaling of an image to reduce its memory footprint. This example configuration may be particularly useful for mobile or other memory-constrained devices that output images designed for devices (such as desktops) with relatively more robust computational resources. Using the enhanced technique described herein, a device is able to decompress a compressed image even when memory is low, thereby avoiding rendering failures and consumption of all remaining memory.

As referred to herein, 'downscaling' refers to a process for reducing the number of pixels or blocks used to represent an image, and may occur using filtering processes which selectively remove certain pixel data, consolidation processes (such as averaging) which combine or consolidate pixel values from multiple pixels into a single, representative pixel, or other techniques. Conversely, 'upscaling' refers to a process for increasing the number of pixels used to represent an image, and may occur using extrapolation processes which assign pixel values to multiple pixels based on a pixel values of one or more representative pixels, or using other approaches, such as techniques that use non-pixel-value data stored with the image file. In example downscaling and upscaling processes, the aspect (height-to-width) ratio of the input and output images may be preserved to reduce further distortion.

Additionally, the term 'resolution' describes an amount of detail held by an image, where higher resolution refers to more image detail, and lower resolution refers to less image detail. 'Resolution' may refer to a physical size, such as a number of scanlines or pixels per inch or millimeter, or an overall size, such as a number of pixels per picture height. In specific instances, 'resolution' may refer to a pixel resolution or pixel count, such as a pixel count of N pixels high by M pixels wide. 'Resolution' may also refer to spectral resolution, temporal resolution, or radiometric resolution.

Figure 1:
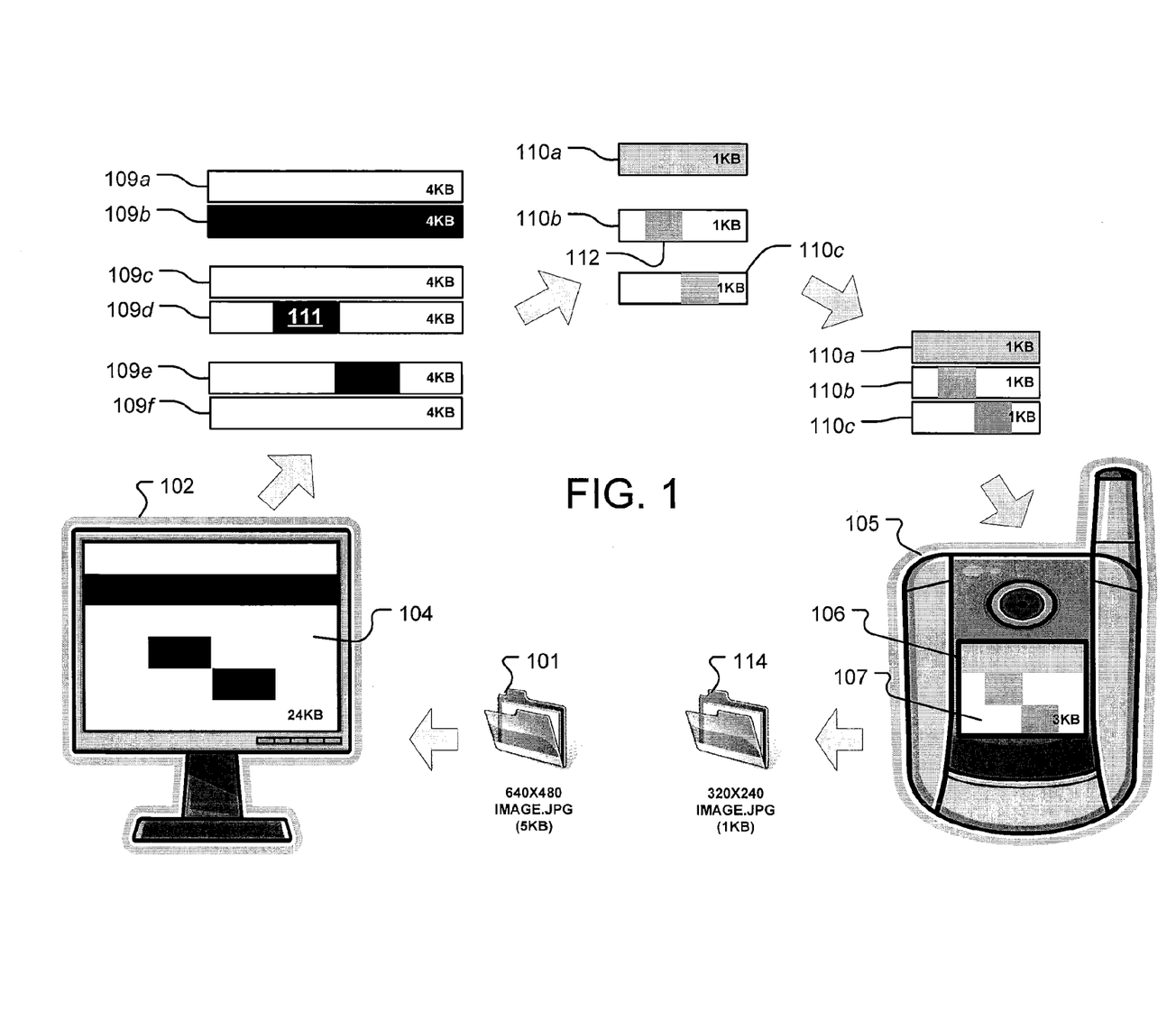
FIGS. 1 and 3 are conceptual diagrams for implementing enhanced decompression of compressed images.

FIG. 1 is a conceptual diagram for implementing the enhanced decompression of compressed images. In FIG. 1, a compressed image with a resolution of 640×480 is stored in a 5 kilobyte (KB) digital file 101 (named 640×480IMAGE.JPG) on a desktop computer 102. A resolution of 640×480 may be associated with a video graphics array (VGA) image or display.

The .JPG file extension reflects the coding of the image using JPEG image compression. The desktop computer 102 includes relatively robust computational resources, for example 1 gigabyte (GB) of random access memory (RAM) and an INTEL® CORE™ 2 QUAD processor, and is capable of easily decompressing the 5 KB digital file 101, to create and output a 24 KB, uncompressed version of the image 104.

For the sake of this example, it is assumed that a user of mobile device 105, which includes a quarter VGA (QVGA) display 106 with a resolution of 320×240 pixels or picture elements, wants to view an uncompressed version of the digital file 101. Since the mobile device is not capable of displaying the 24 KB, uncompressed version of the image 104 in its native resolution, the image 104 will be downscaled (to a downscaled, uncompressed version of the image 107) prior to being output on the display 106.

Since the uncompressed version of the image 104 itself is not output by the mobile device 105, the mobile device 105 may use the enhanced decompression approach to avoid creating the uncompressed version of the 104 in the first place, and may instead dynamically and directly create the downscaled, uncompressed version of the image 107. This direct creation of the downscaled, uncompressed version of the image 107 without necessarily creating the uncompressed version of the image 104 first may save computational resources, or may allow the mobile device 105 to render a version of the digital file 101 under low resource conditions.

Accordingly, a downscale factor is calculated by comparing the bounds, size or resolution of the original version of the image with a target, destination or intended bound, size or resolution. Since the vertical and horizontal resolutions of the original version of the image each include twice as many pixels as the target version of the image, the downscaling factor in this example is two.

Since the downscaling factor is two, the first two scanlines 109a and 109b of the compressed image 101 are decompressed. Notably, since each scanline includes 4 KB of data, decompressing two scanlines of data uses fewer memory resources than decompressing the entire 24 KB uncompressed version of the image 104. If the downscaling factor was determined to be four, the first four horizontal scanlines 109a to 109d of the image would be decompressed. Although FIG. 1 performs the decompression operation using horizontal scanlines, vertical, diagonal, linear, curved or other shaped scanlines may also be used. Additionally, the enhanced process may not use scanlines at all, but may rather decompress a quantity of rectangular sub-blocks of pixels.

The decompressed scanlines 109a and 109b are downscaled using an averaging operation. Specifically, the enhanced decompression averages the white color values of each pixel in the scanline 109a with the black color values of each pixel in the scanline 109b, to generate a 1 KB, gray, downscaled scanline 110a. This downscaled scanline 110 forms the basis of the downscaled, uncompressed version of the image 107.

Once the downscaled scanline 110a is output, the decompression operation iterates or repeats until the uncompressed version of the image 107 is ready for display. For instance, the second two more scanlines 109c and 109d of the compressed image 101 are decompressed and downscaled using an averaging operation. Although the scanlines 109c and 109d are predominantly white, the scanline 109d includes a black pixel (or region) 111 which, when averaged and downscaled with the analogous region of the scanline 109c, forms a gray region 112 on the downscaled scanline 110b. In a further iteration, two additional scanlines 109e and 109f are decompressed and downscaled, to form downscaled scanline 110c.

The decompression operation continues to iterate until all scanlines of the image are decompressed and downscaled. Although FIG. 1 illustrates the decompression operation as starting from the top and working down through the image consecutively, other patterns may also be used. For example, using horizontal scanlines, the decompression operation may commence from the bottom or from the middle, and may skip certain scanlines or interleave through groups of scanlines.

As each decompressed and downscaled scanline is generated, it is added to or composed with the first downscaled scanline 110a to form the 3 KB, downscaled, uncompressed version of the image 107. The downscaled, uncompressed version of the image 107 is output via the display 107, and is stored as a compressed image with a resolution of 320×240 in a 1 kilobyte (KB) digital file 114 (named 320×240IMAGE.JPG) on the mobile device 105.

Significantly, the creation of the 1 KB digital file 114 did not require the creation of the 24 KB uncompressed version of the image 104. By comparison, such an approach would decompress the image to a buffer of a sufficient size to hold the 24 KB uncompressed version of the image 104, and then downscale or downsample the buffered image to the target resolution using an appropriate filtering scheme. If pixel depth is increased, the problems faced by this comparative approach are exacerbated. For example, 32-bit pixel depths consume twice as much memory as 16-bit depths.

During the decompression operation, total memory consumption may be reduced. While other approaches have a huge spike in live memory use during the image decompression and downscaling operations, the enhanced approach described herein allows an application to place a cap on total memory consumption to the target downscaled image dimensions plus a small additional storage for extra scanlines, as determined by the downscaling factor.

Figure 3:
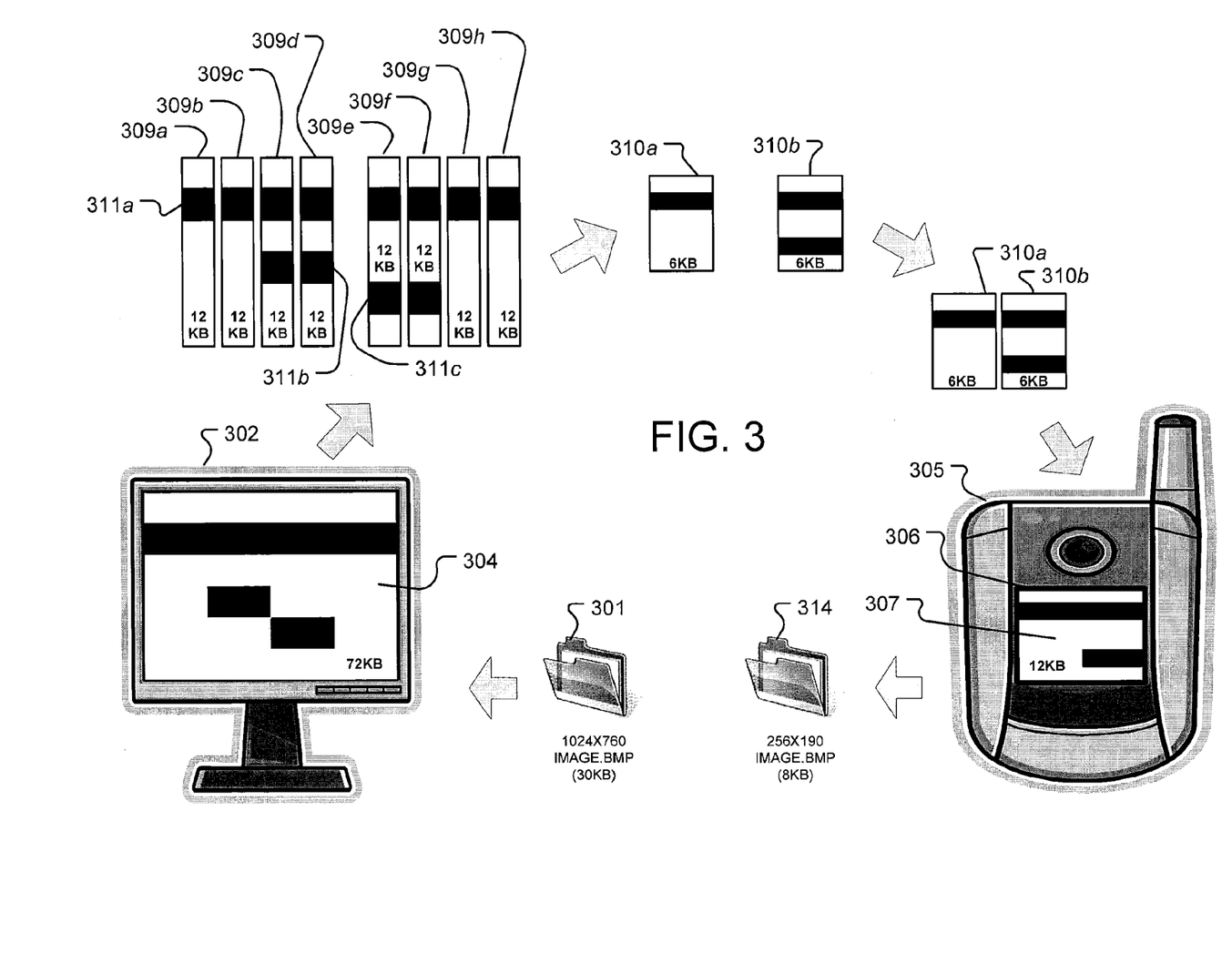

For ease of explanation, FIGS. 1 and 3 assign certain arbitrary sizes to compressed and uncompressed versions of an image, and portions or scanlines of the image. For instance, FIG. 1 illustrates a compressed 640×480 JPEG image as being 5 KB in size, an uncompressed version of the image as being 24 KB in size, a fully scaled scanline of the image as being 4 KB in size, a scaled scanline of the image as being 1 KB in size, a downscaled version of the image being 3 KB in size, and a compressed and downscaled, 320×240 JPEG image as being 1 KB in size. Since these numbers are purely arbitrary and are intended for exemplary purposes only, any relationship between these sizes and compression ratios with actual or measured sizes and compression ratios is believed to be purely coincidental. As such, the enhanced approach described herein is germane to images or image portions of any size, and any germane of compression and downscaling process.

To further illustrate this point in the context of one real-world example, a comparative approach may be used to display an image with dimensions of 640×480, with a pixel depth of 16 bits (2 bytes). Assuming no scaling, the decompressed image size must be housed in a 600 KB buffer (640*480*2/1024) before any downscaling occurs. If the target resolution or dimension is 160×120, a target buffer 37.5 KB (160*120*2/1024) must be allocated. During the lifetime of this process, the peak live memory consumption is at least 637.5 KB.

Using the enhanced approach, the upfront cost of consuming 600 KB is avoided entirely. The entire process of downscaling operates using a 37.5 KB target buffer plus a 5 KB storage (640*4*2/1024) for four the scanlines each of a 640 pixel width (since the downscaling factor is 4). Thus, the peak live memory consumption is 42.5 KB, or one-fifteenth the size of the buffer used in the comparative approach. Such a dramatic difference in memory size is not associated with any perceivable change in execution time, since the same number of scanlines are decompressed, and the same downsampling is applied.

Figure 2:
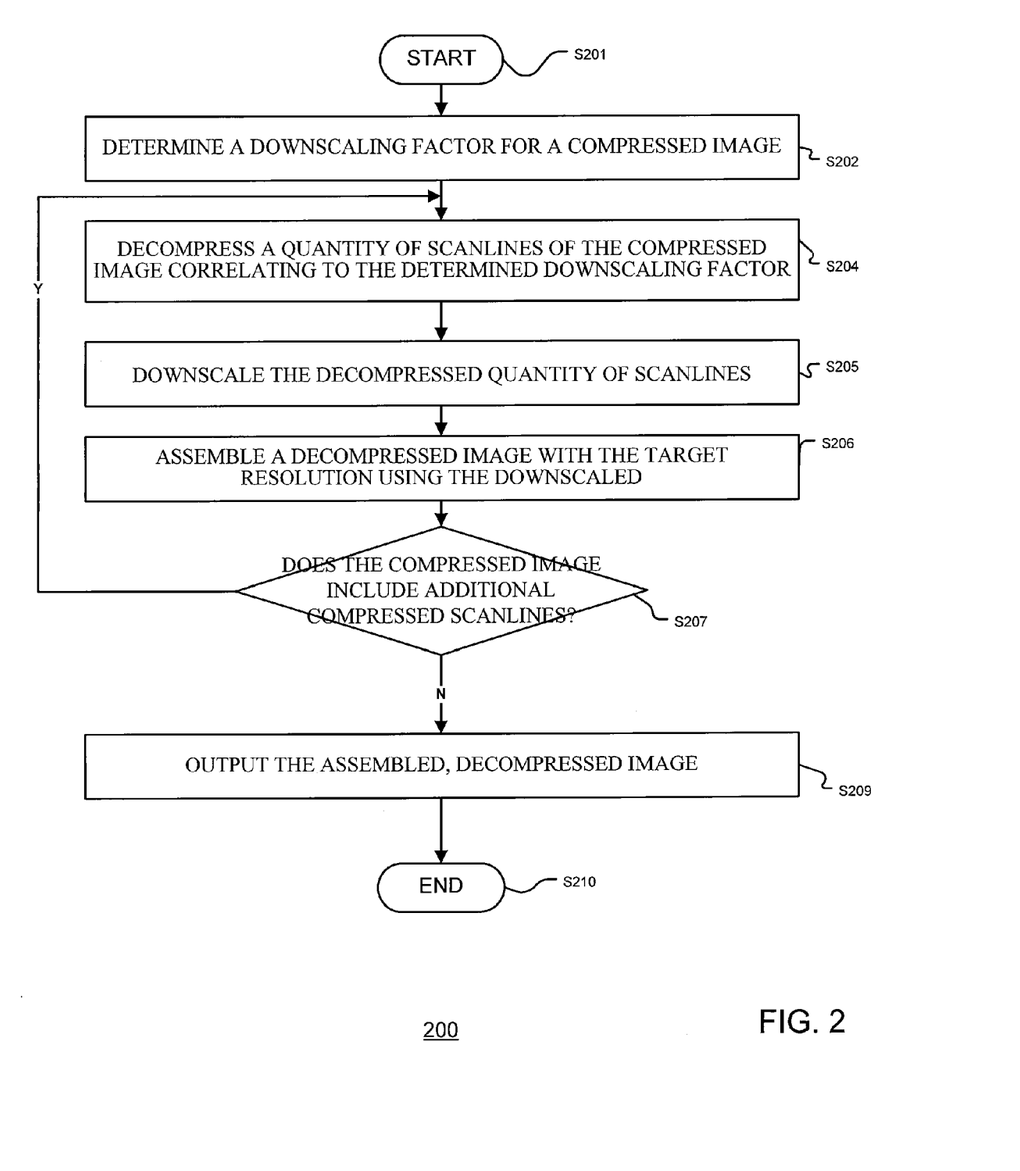
FIG. 2 is a flowchart of an enhanced decompression process.

FIG. 2 is a flowchart of an enhanced decompression process 200. Briefly, the process includes determining a downscaling factor for a compressed still image or video image based on an original resolution of the compressed image and a target resolution, and iteratively decompressing a quantity of scanlines of the compressed image correlating to the determined downscaling factor. The process 200 also includes downscaling, for each iterative decompression, the iteratively decompressed quantity of scanlines, and assembling a decompressed image with the target resolution using the downscaled quantity of scanlines.

In more detail, when the process 200 begins (S201), a downscaling factor for a compressed image is determined based on an original resolution of the compressed image and a target resolution. The compressed image may be compressed using a TIFF format, a PNG format, a GIF format, a JPEG format, a RAW image file format, or a BMP format. The 'target resolution' may refer to a screen resolution of a mobile device storing the compressed image, or the intended, available, or eventual resolution of an uncompressed version of the compressed image on the device displaying the uncompressed version. The 'original resolution' refers to a native resolution associated with an uncompressed version of the compressed image.

The compressed image may include a plurality of scanlines. A scanline (or "scan line") generally refers to one line or row in a raster scanning pattern, such as a video line on a cathode ray tube (CRT) display of a television or computer. A scanline represents a row of picture elements, pixels, or blocks in the compressed image.

An integeric downscaling factor may be used to enhance performance. If the determined downscale factor is not an integer, it may be rounded up or down to an integer, such as the nearest integer, or the nearest integer above or the nearest integer below the determined downscale factor. If the aspect ratios of the original resolution and the target resolution do not match, multiple provisional downscaling factors may be determined, and the actual downscaling factor may be determined by selecting one of the provisional downscaling factors, or by combining the provisional downscaling factors. This may occur, for example, if the original image is a widescreen, 16:9 video still image, while the output device has a 4:3 display.

In this case, a first provisional downscaling factor of three (9/3) may be determined based on comparing the vertical aspects of the original and target resolutions, and a second provisional downscaling factor of four (16/4) may be determined based on comparing the horizontal aspects of the original and target resolutions. A downscaling factor of three, four, or any number (such as a number in between three and four) may be selected.

If the downscaling factor of less than four is used, the downscaled, uncompressed version of the image will fit vertically within the target display, however, a portion of the uncompressed image will not fit horizontally within the display, thereby changing the overall aspect ratio of the uncompressed image on the displaying device. If the downscaling factor of four (or more) is selected, the image will fit horizontally within the display and the overall aspect ratio of the target image will remain the same, however the target image will not completely fill at least the vertical portion of the display.

The downscaling factor may be determined based on Equation (1), below.

$$f=(\text{MIN}(\text{floor}(w/wDst),\text{floor}(h,hDst)) \text{ if } (f==1)\{f=2\} \quad (1)$$

In Equation (1), f represents the downscaling factor, wand h respectively represent horizontal and vertical aspects of the original resolution, and wDst and hDst respectively represent horizontal and vertical aspects of the target resolution.

A quantity of scanlines of the compressed image correlating to the determined downscaling factor is decompressed (S204). A scanline may be a horizontal, one-pixel-high row, a vertical, one-pixel-wide line of the image, or a diagonal line. This quantity of scanlines, which is a subset of the plurality of scanlines that make up the compressed image, may be determined based on the downscaling factor.

The downscaling factor determines the number or quantity of scanlines to be decompressed and downscaled at a time, and thus correlates to, is quantifiably associated, or is otherwise related to the quantity of scanlines. In the case where the aspect ratios of the original resolution and target resolution is the same, the downscaling factor may be determine by dividing the number of vertical (or horizontal) picture elements in the original resolution by the number of vertical (or horizontal, respectively) picture elements in the target resolution. This resulting number also represents the quantity of scanlines to decompress in one iteration.

In an example where the aspect ratios of the original resolution and target resolution is not the same, the downscaling factor may be determined (as above) by dividing the vertical or horizontal picture elements of the original and target resolutions, or by dividing the total number of picture elements of the original and target resolutions. If the calculation is based on the total number of elements, the resulting number may be processed by an additional calculation (such as a square root calculation) to determine the quantity of scanlines to decompress in one iteration. In this regard, the downscaling factor may 'correlate' to the quantity of scanlines to decompress directly, as in the case where the numbers are the same, or indirectly, as in the case where the numbers are not the same but are related by a fixed or known mathematical expression.

It is also possible to dynamically or automatically omit the downscaling operation if the resources of the device displaying the compressed image are sufficient to display the image without requiring downscaling. For example, downscaling may be dynamically omitted where the available memory meets or exceeds a heuristic, such as a heuristic that checks to see if an ISLOWMEMORY( ) function fails a preset number of times. Such a heuristic would thus omit the downscaling operation where a low memory condition is not detected.

The decompressed quantity of scanlines is downscaled (S205). A low memory condition may be detected, and the iteratively decompressed quantity of scanlines may be downscaled if the low memory condition is detected. Downscaling the iteratively decompressed quantity of scanlines may further include averaging characteristics of the iteratively decompressed quantity of scanlines or filtering the iteratively decompressed quantity of scanlines. The iteratively decompressed quantity of scanlines may be discarded after the quantity of scanlines has been downscaled.

Although downscaling has been described herein as using averaging, other techniques may also be used. For instance, the downscaling may be a pluggable operation, in the sense that any type of downscaling (e.g. bilinear, bicubic, nearest neighbor, etc.) may be implemented. In this regard, a downscaling technique may be dynamically selected based on the downscale factor, which affects the number of scanlines and pixel samples that are made available to a resampling filter. In a further implementation, rectangular sub-blocks of pixels are decompressed instead of scanlines, to better comport with particular filtering processes.

A decompressed image with the target resolution is assembled using the downscaled quantity of scanlines (S206). In one example implementation, the decompressed image is immediately assembled during each iteration, such as after each quantity of scanlines has been decompressed or downscaled. Using this approach, portions of the image can be output to a user while the decompressing or downscaling operation is still occurring. In another example implementation, the decompressed image is assembled after all iterations have occurred, such as after all of the scanlines have been decompressed or downscaled. Using this latter approach, the entire image may be output to the user at once.

If the compressed image includes additional compressed scanlines (at S207), additional quantities of scanlines are decompressed in an iterative manner or fashion (S204 et seq.). If the compressed image does not include additional compressed scanlines (at S207), the assembled, decompressed image may be output (S209), thereby ending the process 200 (S210).

The assembled, decompressed image may be upscaled, such that the assembled image occupies the same-sized region as the original image. If the original compressed image has been downscaled, the resulting upscaled image will not have the same fidelity or contain the same level of detail as the original image. Although downscaling leads to loss of details in the image since the quantity of pixels is reduced, the user will at least see some version of the image instead of causing an out-of-memory conditions, which may result in an application crash.

Although the iteratively decompression of the quantity of scanlines of the compressed image has been described above as a sequential operation for the sake of brevity and for ease of explanation, in another example implementation the scanlines are decompressed and/or downscaled in parallel. For example, a first of the quantity of scanlines may be decompressed and/or downscaled in parallel with decompressing and/or downscaling a second of the quantity of scanlines.

According to this enhanced decompression approach, the quality of the uncompressed image to render is dynamically lowered while concurrently lowering memory consumption requirements. The original aspect ratio or dimensions of the rendered image, however, may be the same as the normal decompressed image.

FIG. 3 is a conceptual diagram for another general approach for implementing the enhanced decompression of compressed images. Unlike FIG. 1, and among other things, the approach illustrated in FIG. 3 iteratively decompresses vertical scanlines instead of horizontal scanlines, performs downscaling using a filtering process instead of an averaging process, and has a determined downscaling factor of four instead of a downscaling factor of two.

In more detail, a compressed Extended Graphics Array (XGA) image with a resolution of 1024×760 is stored in a 30 KB digital file 301 (named 1024×760IMAGE.BMP) on a desktop computer 302. The .BMP file extension reflects the coding of the image using the bitmap image format. The desktop computer 302 includes relatively robust computational resources is easily capable of decompressing the 30 KB digital file 301, to create and output a 72 KB, uncompressed version of the image 304.

A user of mobile device 305, which includes a display 106 with a non-standard resolution of 320×240, issues a command to view the contents of the digital file 301. Since the mobile device is not capable of displaying the 72 KB, uncompressed version of the image 304 in its native resolution, the image 304 is downscaled (to a downscaled, uncompressed version of the image 307) prior to being output on the display 306.

A downscale factor is calculated by comparing aspects of the resolution of the original version of the image with the resolution of the display 306. Since the vertical and horizontal resolutions of the original version of the image 304 each include four times as many pixels as the display 306, the downscaling factor in this example is four.

Since the downscaling factor is four, the first four scanlines 309a and 309d of the compressed image 301 are decompressed. Since each scanline includes 12 KB of data, decompressing four vertical scanlines of data uses fewer memory resources than decompressing the entire 72 KB uncompressed version of the image 104.

The decompressed scanlines 309a and 309d are downscaled using a filtering operation, in which three of the four vertical scanlines are discarded, and one of the vertical scanlines is selected to be downscaled without regard for the characteristics of the other scanlines. The selected scanline may be an arbitrarily selected scanline, such as the first, third, or nth scanline, or may be dynamically selected based on characteristics of the scanline such as pixel value uniformity or non-uniformity.

Since the enhanced decompression operation illustrated in FIG. 3 selects the first of each four scanlines selected for decompression, scanline 309a is selected for downscaling, and scanlines 309b to 309d are discarded. Downscaled scanline 309, which includes a dark pixel corresponding to pixel (or region) 311a but does not include a dark pixel corresponding to pixel (or region) 311b, is output as a result of the downscaling operation on vertical scanline 309a.

This downscaled scanline 310a forms the basis of the downscaled, uncompressed version of the image 307. Once the downscaled scanline 310a is output, the decompression operation iterates. Specifically, the second set of four scanlines 309e and 309h of the compressed image 301 are decompressed and downscaled using an averaging operation, thereby outputting a downscaled scanline 310b. The decompression operation continues to iterate until all scanlines of the image are decompressed and downscaled.

As each decompressed and downscaled scanline is generated, it is added to or composed with the first downscaled scanline 310a to form the 12 KB, downscaled, uncompressed version of the image 307. The downscaled, uncompressed version of the image 307 is output via the display 307, and is stored as a compressed image with a resolution of 256×190 is stored in an 8 kilobyte (KB) digital file 314 (named 256× 2190IMAGE.JPG) on the mobile device 305. As in the other example, the creation of the 12 KB digital file 314 did not require the generation of the 72 KB uncompressed version of the image 304.

Notably, although original uncompressed image 104 of FIG. 1 and original uncompressed image 304 of FIG. 3 were similar, the resulting or target uncompressed image 107 and uncompressed image 307 appear quite different. This disparity is caused in part by the differences in downscaling technique, as well as the type of scanline used by the decompression operation.

Thus, a decompressed image with a target resolution may be assembled using an iteratively decompressed and downscaled quantity of scanlines of a compressed image, the quantity of scanlines correlating to a downscaling factor determined based on an original resolution of the compressed image and the target resolution.

The subject matter and the functional operations described herein can be implemented in digital electronic circuitry, or in computer software, firmware, or hardware, including the structures disclosed in this specification and their structural equivalents, or in combinations of one or more of them. The subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, or a combination of one or more of them.

For example, a computer program product may be tangibly embodied in a machine-readable medium. The computer program product includes instructions that, when read by a machine, operate to cause a data processing apparatus to determine a downscaling factor for a compressed image based on an original resolution of the compressed image and a target resolution, and to iteratively decompress a quantity of scanlines of the compressed image correlating to the determined downscaling factor. The computer program product also includes instructions that, when read by a machine, operates to cause a data processing apparatus to downscale, for each iterative decompression, the iteratively decompressed quantity of scanlines, and to assemble a decompressed image with the target resolution using the downscaled quantity of scanlines.

In another example, a computer-implemented method includes determining a downscaling factor for a compressed image based on an original resolution of the compressed image and a screen resolution of a mobile device storing the compressed image, where the image is compressed using a JPEG format and includes a plurality of scanlines. The method also includes determining a quantity of scanlines of the compressed image based on the determined downscaling factor, the quantity of scanlines being a subset of the plurality of scanlines, detecting a low memory condition of a mobile device, and iteratively decompressing the quantity of scanlines each comprising a horizontal, one-pixel-high row of the image. Furthermore, the method includes downscaling, for each iterative decompression, the iteratively decompressed quantity of scanlines if the low memory condition is detected, by averaging characteristics of the iteratively decompressed quantity of scanlines, and assembling a decompressed image with the target resolution using the iteratively decompressed quantity of scanlines. Additionally, the method includes upscaling the assembled image, and outputting the upscaled image at the mobile device, where the upscaled image and the compressed image share a same aspect factor.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

For instance, a device may include a processor that determines a downscaling factor for a compressed image based on an original resolution of the compressed image and a target resolution, and iteratively decompresses a quantity of scanlines of the compressed image correlating to the determined downscaling factor. The processor also downscales, for each iterative decompression, the iteratively decompressed quantity of scanlines; and assembles a decompressed image with the target resolution using the downscaled quantity of scanlines.

To provide for interaction with a user, embodiments of the subject matter described in this specification can be implemented on a computer having a display device, e.g., a CRT or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

Figure 4:
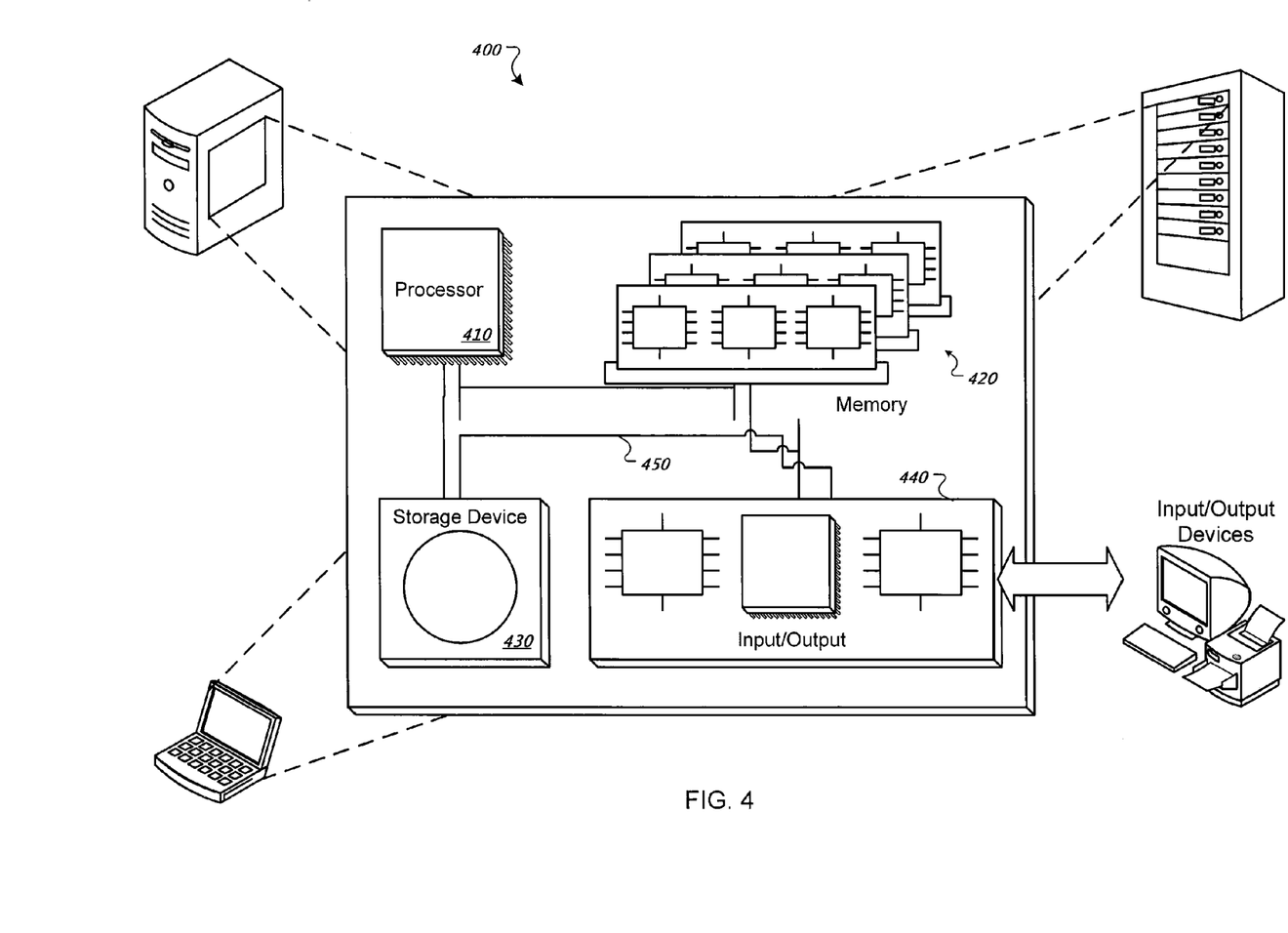
FIG. 4 is a schematic representation of an exemplary device that implements enhanced decompression as described herein.

An example of one such type of computer is shown in FIG. 4, which shows a block diagram of a programmable processing system 400 suitable for implementing apparatus or performing methods of various aspects of the subject matter described in this specification. The system 400 includes a processor 410, a random access memory (RAM) or a program memory 420 (for example, a writable read-only memory (ROM) such as a flash ROM), a hard drive controller, a video controller, and an input/output (I/O) controller 440 coupled by a processor (CPU) bus 450. The system 400 can be pre-programmed, in ROM, for example, or it can be programmed (and reprogrammed) by loading a program from another source (for example, from a floppy disk, a CD-ROM, or another computer).

The processor 410 is one or more of a number of high-performance computer processors, including an INTEL® or AMD® processor, a POWERPC® processor, a MIPS® reduced instruction set computer ("RISC") processor, a SPARC® processor, an ACORN® RISC Machine ("ARM®") architecture processor, a HP ALPHASERVER® processor or a proprietary computer processor for a mainframe. In an additional arrangement, the processor 410 is more than one processing unit, including a multiple CPU configuration found in high-performance workstations and servers, or a multiple scalable processing unit found in mainframes.

The hard drive controller is coupled to a storage device 430 suitable for storing executable computer programs, including programs embodying aspects of the subject matter described herein. The video controller is coupled to a video recorder, which can be used for storing and importing video footage and for writing final output.

The storage device 430 may be a fixed or removable storage device that is used to off-load data from the system 400 or upload data onto the system. The storage device 430 may be a floppy disk drive, an IOMEGA® ZIP® drive, a compact disk-read only memory ("CD-ROM") drive, a CD-Recordable drive ("CD-R"), a CD-Rewritable drive ("CD-RW"), flash memory, a USB flash drive, an external or internal hard disk drive, thumb drive, pen drive, key drive, a High-Density Digital Versatile Disc ("HD-DVD") optical disc drive, a Blu-Ray optical disc drive, a Holographic Digital Data Storage ("HDDS") optical disc drive, or any one of the various recordable or rewritable digital versatile disc ("DVD") drives such as the DVD-Recordable ("DVD-R" or "DVD+R"), DVD-Rewritable ("DVD-RW" or "DVD+RW"), or DVD-RAM. Operating system programs, applications, and various data files, are stored on disks, which are stored on the storage device 430.

The I/O controller 440 is coupled by means of an I/O bus to an I/O interface. The I/O interface receives and transmits data (e.g., stills, pictures, movies, and animations for importing into a composition) in analog or digital form over communication links such as a serial link, local area network, wireless link, and parallel link. Also coupled to the I/O bus is a display and a keyboard. Alternatively, separate connections (separate buses) can be used for the I/O interface, display and keyboard.

The I/O controller may use a wireline or wireless connector. Example wireless connectors include, for example, an INFRARED DATA ASSOCIATION® ("IrDA®") wireless connector, an optical wireless connector, an INSTITUTE OF ELECTRICAL AND ELECTRONICS ENGINEERS® ("IEEE®") Standard 802.11 wireless connector, a BLUETOOTH® wireless connector, a near field communications ("NFC") connector, an orthogonal frequency division multiplexing ("OFDM") ultra wide band ("UWB") wireless connector, a time-modulated ultra wide band ("TM-UWB") wireless connector, or other wireless connector. Example wireline connectors include, for example, a IEEE®-1394 FIREWIRE® connector, a Universal Serial Bus ("USB") connector, a serial port connector, a parallel port connector, or other wireline connector.

The operating system used by the system 400 may be APPLE® MAC OS X® for INTEL® and POWERPC® based workstations and servers; MICROSOFT® WINDOWS NT®/WINDOWS® 2000/WINDOWS® XP Workstation; MICROSOFT® WINDOWS VISTA®/WINDOWS NT®/ WINDOWS® 2000/WINDOWS® XP Server; a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers; SYMBIAN OS®, NEWTON®, IPOD®, WINDOWS MOBILE® or WINDOWS CE®, PALM®, NOKIA® OS ("NOS"), OSE®, or EPOC® for mobile devices, or a proprietary operating system for computers or embedded systems. The application development platform or framework for the operating system may be: BINARY RUNTIME ENVIRONMENT FOR WIRELESS® ("BREW®"); Java Platform, Micro Edition ("Java ME") or Java 2 Platform, Micro Edition ("J2ME®"); PYTHON™, FLASH LITE®, or MICROSOFT®.NET Compact.

While this specification contains many implementation details, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be used in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As to formal matters, while the term "user" has been consistently used to describe an entity that interacts with these processes, such a generalization is also intended to describe multiple related or unrelated, living or automated entities or beings that interact with these processes at various different, overlapping or non-overlapping states. In a similar vein, the term "selection" is intended to denote throughout a manual selection by a human, an automatic selection by a non-human, or some combination thereof. Finally, it is noted that, for the sake of brevity, the term "JavaScript" is intended to reference the SUN MICROSYSTEMS® JAVASCRIPT® programming language, and the term "XML" is intended to reference 'eXtensible Markup Language' throughout.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   determining a downscaling factor for a compressed image based on an original resolution of the compressed image and a screen resolution of a mobile device storing the compressed image, wherein the image is compressed using a Joint Photographic Experts Group (JPEG) format and includes a plurality of scanlines;
determining a quantity of scanlines of the compressed image based on the determined downscaling factor, the quantity of scanlines being a subset of the plurality of scanlines;
detecting a low memory condition of a mobile device;
iteratively decompressing the quantity of scanlines each comprising a horizontal, one-pixel-high row of the image;
downscaling, for each iterative decompression, the iteratively decompressed quantity of scanlines if the low memory condition is detected, further comprising:
averaging characteristics of the iteratively decompressed quantity of scanlines;
assembling a decompressed image with the target resolution using the iteratively decompressed quantity of scanlines;
upscaling the assembled image; and
outputting the upscaled image at the mobile device, wherein the upscaled image and the compressed image share a same aspect factor.

2. A method performed by one or more processes executing on a computer system the method comprising:
determining a downscaling factor for a compressed image based on an original resolution of the compressed image and a target resolution;
iteratively decompressing a quantity of scanlines of the compressed image correlating to the determined downscaling factor;
downscaling, for each iterative decompression, the iteratively decompressed quantity of scanlines; and
assembling a decompressed image with the target resolution using the downscaled quantity of scanlines.

3. The method of claim 2, further comprising outputting the assembled, decompressed image.

4. The method of claim 2, wherein the downscaling factor is an integer.

5. The method of claim 2, further comprising determining the quantity of scanlines of the compressed image based on the determined downscaling factor.

6. The method of claim 2, wherein the quantity of scanlines equals the downscaling factor or is inversely proportional to the downscaling factor.

7. The method of claim 2, further comprising:
detecting a low memory condition; and
downscaling the iteratively decompressed quantity of scanlines if the low memory condition is detected.

8. The method of claim 2, wherein the compressed image is compressed using a Tagged Image File Format (TIFF) format, a Portable Network Graphics (PNG) format, a Graphics Interchange Format (GIF) format, a Joint Photographic Experts Group (JPEG) format, a RAW image file format, or a bitmap (BMP) format.

9. The method of claim 2, wherein downscaling the iteratively decompressed quantity of scanlines further comprises averaging characteristics of the iteratively decompressed quantity of scanlines or filtering the iteratively decompressed quantity of scanlines.

10. The method of claim 2, wherein the original resolution and the target resolution share a same aspect factor.

11. The method of claim 2, wherein a scanline comprises a horizontal, one-pixel-high row; a vertical, one-pixel-wide line of the image; or a one-pixel-thick diagonal line.

12. The method of claim 2, further comprising upscaling the assembled, decompressed image.

13. The method of claim 2, wherein the target resolution comprises a screen resolution of a mobile device storing the compressed image.

14. The method of claim 2, further comprising discarding the iteratively decompressed quantity of scanlines after the quantity of scanlines has been downscaled.

15. The method of claim 2, wherein the image further comprises a plurality of scanlines, and wherein the quantity of scanlines is a subset of the plurality of scanlines.

16. The method of claim 2, the downscaling factor is determined based on:

$$f=(\text{MIN}(\text{floor}(w/wDst),\text{floor}(h,hDst)) \text{ if } (f==1)\{f=2\},$$

wherein f represents the downscaling factor, w and h respectively represent horizontal and vertical aspects of the original resolution, and wDst and hDst respectively represent horizontal and vertical aspects of the target resolution.

17. The method of claim 2, wherein the original resolution comprises a resolution associated with an uncompressed version of the compressed image.

18. The method of claim 2, wherein iteratively decompressing the quantity of scanlines of the compressed image further comprises decompressing a first of the quantity of scanlines in parallel with decompressing a second of the quantity of scanlines.

19. A computer program product, tangibly embodied in a non-transitory machine-readable medium, the computer program product comprising instructions that, when read by a machine, operate to cause a data processing apparatus to:
determine a downscaling factor for a compressed image based on an original resolution of the compressed image and a target resolution;
iteratively decompress a quantity of scanlines of the compressed image correlating to the determined downscaling factor;
downscale, for each iterative decompression, the iteratively decompressed quantity of scanlines; and
assemble a decompressed image with the target resolution using the downscaled quantity of scanlines.

20. A device comprising a processor configured to execute instructions stored in a non-transitory machine-readable medium; and
a memory serving as the non-transitory machine-readable medium and storing processor-executable instructions to cause the device to perform operations comprising:
determine a downscaling factor for a compressed image based on an original resolution of the compressed image and a target resolution;
iteratively decompress a quantity of scanlines of the compressed image correlating to the determined downscaling factor;
downscale, for each iterative decompression, the iteratively decompressed quantity of scanlines; and
assemble a decompressed image with the target resolution using the downscaled quantity of scanlines.

21. A method performed by one or more processes executing on a computer system the method comprising assembling a decompressed image with a target resolution using an iteratively decompressed and downscaled quantity of scanlines of a compressed image, the quantity of scanlines correlating to a downscaling factor determined based on an original resolution of the compressed image and the target resolution.

* * * * *